(12) United States Patent
Supriya et al.

(10) Patent No.: US 9,156,973 B2
(45) Date of Patent: Oct. 13, 2015

(54) MELTPROCESSED FLUOROPOLYMER ARTICLE AND METHOD FOR MELT-PROCESSING FLUOROPOLYMERS

(71) Applicants: Lakshmi Supriya, Arlington, MA (US); Christopher M. Comeaux, Worcester, MA (US); Mathilde Leboeuf, Marlborough, MA (US)

(72) Inventors: Lakshmi Supriya, Arlington, MA (US); Christopher M. Comeaux, Worcester, MA (US); Mathilde Leboeuf, Marlborough, MA (US)

(73) Assignee: SAINT-GOBAIN PERFORMANCE PLASTICS CORPORATION, Aurora, OH (US)

( * ) Notice: Subject to any disclaimer, the term of this patent is extended or adjusted under 35 U.S.C. 154(b) by 0 days.

(21) Appl. No.: 13/631,089

(22) Filed: Sep. 28, 2012

(65) Prior Publication Data
US 2013/0085220 A1    Apr. 4, 2013

Related U.S. Application Data

(60) Provisional application No. 61/541,826, filed on Sep. 30, 2011.

(51) Int. Cl.
*C08L 27/18* (2006.01)
*C08K 3/00* (2006.01)
*C08L 67/03* (2006.01)

(52) U.S. Cl.
CPC *C08L 27/18* (2013.01); *C08L 67/03* (2013.01)

(58) Field of Classification Search
CPC .............................. C08L 27/18; C08L 67/03
USPC ......... 524/404, 406, 420, 425, 430, 437, 445, 524/451, 494
See application file for complete search history.

(56) References Cited

U.S. PATENT DOCUMENTS

| | | | |
|---|---|---|---|
| 4,417,020 A | 11/1983 | Bailey et al. | |
| 4,429,078 A | 1/1984 | Cogswell et al. | |
| 5,567,770 A * | 10/1996 | Luise | 525/165 |
| 5,767,198 A * | 6/1998 | Shimizu et al. | 525/133 |
| 6,166,138 A | 12/2000 | Kolouch | |
| 6,203,207 B1 | 3/2001 | Yamamoto et al. | |
| 6,433,093 B2 | 8/2002 | Lee et al. | |
| 6,867,367 B2 | 3/2005 | Zimmerman | |
| 7,261,937 B2 | 8/2007 | Lee et al. | |
| 2001/0006727 A1 * | 7/2001 | Lee et al. | 428/373 |
| 2004/0046329 A1 | 3/2004 | Pieters | |
| 2004/0121088 A1 | 6/2004 | Bloom | |
| 2005/0001423 A1 | 1/2005 | Vila | |
| 2005/0012080 A1 | 1/2005 | Zimmerman et al. | |
| 2008/0305355 A1 | 12/2008 | Zimmerman et al. | |
| 2010/0130690 A1 * | 5/2010 | Nanba et al. | 525/200 |
| 2011/0209755 A1 | 9/2011 | Zimmerman et al. | |
| 2012/0251020 A1 | 10/2012 | Swei | |

FOREIGN PATENT DOCUMENTS

| | | | |
|---|---|---|---|
| CA | 2152283 | A | 7/1994 |
| EP | 1052272 | A2 | 11/2000 |
| EP | 1086987 | A1 | 3/2001 |
| JP | S63230756 | A | 9/1988 |
| JP | H08504874 | A | 5/1996 |
| JP | H10158456 | A | 6/1998 |
| JP | 2001088162 | A | 4/2001 |
| JP | 2002265729 | A | 9/2002 |
| JP | 2011169466 | A | 9/2011 |
| KR | 10-2000-0077159 | A | 12/2000 |
| WO | 9414890 | | 7/1997 |
| WO | 2004/081103 | A2 | 9/2004 |

OTHER PUBLICATIONS

DuPont Zonyl MP1500 Brochure Dec. 2004.*
http://www.qlpkg.com/gfx/ACCE_QLP_GM_Final_20080917.pdf, Interplex Quantum Leap, printed to pdf Dec. 18, 2012,1 pg.
Sina Ebnesajjad, Fluoroplastics, vol. 2: Melt Processible Fluoroplastics: The Definitive User's Guide (Fluoropolymers), Jan. 14, 2003, p. 9.
Isayev, A., "Self-reinforced composites involving liquid crystalline polymers," Liquid Crystalline Polymer Systems, ACS Symposium Series, Institute of Polymer Engineering, University of Akron, Akron, OH, 1996, 20 pgs.
International Search Report from PCT/EP2012/057994, dated Mar. 28, 2013, 2 pgs.

* cited by examiner

*Primary Examiner* — Randy Gulakowski
*Assistant Examiner* — Christopher M Rodd
(74) *Attorney, Agent, or Firm* — Abel Law Group, LLP; Chi Suk Kim

(57) ABSTRACT

A polymer article includes a meltprocessable blend of a melt-viscid fluoropolymer and a liquid crystalline polymer. Methods are presented for preparing a meltprocessable blend from a melt-viscid fluoropolymer and liquid crystalline polymer.

18 Claims, 3 Drawing Sheets

MELTPROCESSED FLUOROPOLYMER ARTICLE AND METHOD FOR MELT-PROCESSING FLUOROPOLYMERS

CROSS-REFERENCE TO RELATED APPLICATION(S)

The present application claims priority from U.S. Provisional Patent Application No. 61/541,826 filed Sep. 30, 2011, entitled "MELTPROCESSED FLUOROPOLYMER ARTICLE AND METHOD FOR MELT-PROCESSING FLUOROPOLYMERS," naming Lakshmi Supriya, Christopher M. Comeaux and Mathilde Leboeuf, which application is incorporated by reference herein in its entirety.

FIELD OF THE DISCLOSURE

This disclosure, in general, relates to melt processing of fluoropolymer materials and articles prepared by such processes.

BACKGROUND

Many fluoropolymers such as polytetrafluoroethylene (PTFE) have a very high melt viscosity of more than $10^{10}$ Poise. However, due to its full fluorination, PTFE and other perfluorinated polymers are highly preferred when it comes to material properties such as resilience to chemicals, heat, and stress, low coefficient of friction; and low dielectric constant.

Due to the high melt viscosity, these fluoropolymers are difficult to process by normal methods of extrusion and injection molding.

As such, improved methods that make fluoropolymer compositions melt-processable would be desirable.

SUMMARY

In a first aspect, a polymeric article includes a meltprocessable blend. The blend includes a melt-viscid fluoropolymer. The blend can further include a liquid crystalline polymer (LCP).

A polymer is melt-viscid when its melt-viscosity exceeds the ability to process the material by extrusion or inject molding. In one embodiment, a polymer can be melt-viscid when its melt viscosity is at least $10^5$ Poise.

In a second aspect, a method for preparing a polymeric article includes mixing a melt-viscid fluoropolymer powder with a liquid crystalline polymer (LCP) to form a mixture.

In a third aspect, a method for reducing the melt viscosity of a fluoropolymer composition includes mixing a liquid crystalline polymer (LCP) into a fluoropolymer powder to form a mixture. The weight ratio of fluoropolymer to LCP can be at least about 50:50. The weight ratio of fluoropolymer to LCP can be not greater than about 99:1, such as not greater than about 95:5, not greater than about 90:10, not greater than about 85:15, not greater than about 80:20, not greater than about 75:25, not greater than about 70:30, or not greater than about 60:40. The method can further include extruding the mixture into a product.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENTS

Figure 1:
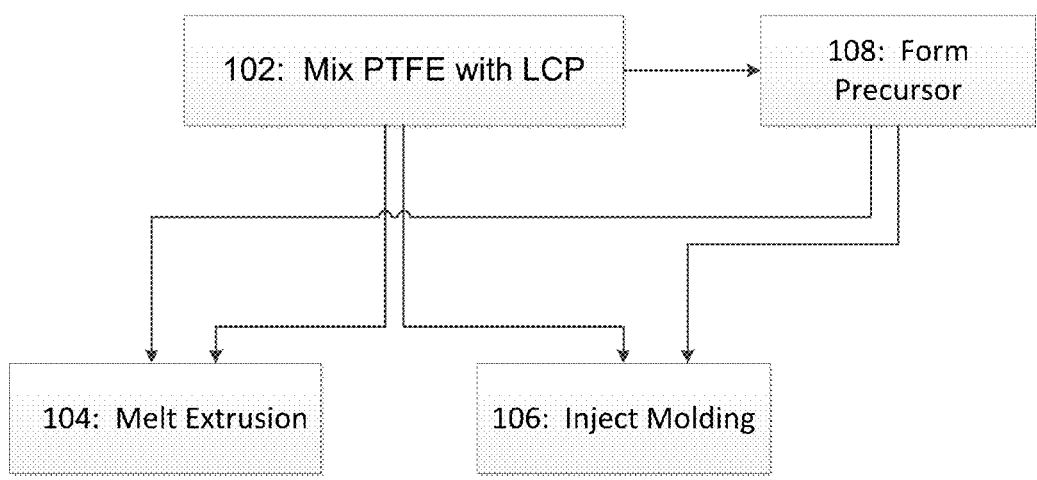
FIG. 1 includes a flow chart various embodiments of the method for preparing a polymeric article.

In one embodiment, a polymeric article includes a melt-processable blend of a melt-viscid fluoropolymer and a liquid crystalline polymer (LCP). A polymer is melt-viscid when its melt-viscosity exceeds the ability to process the material by extrusion or inject molding. In one embodiment, a polymer can be melt-viscid when its melt viscosity is at least $10^5$ Poise. For example, when the process requires injection molding of a thin layer, a polymer or a polymer mixture having a melt viscosity of $10^5$ Poise can be considered to be melt-viscid. In another embodiment, a polymer or polymer mixture can be melt-viscid if it has a melt viscosity of at least $10^7$ Poise. For example, when the process requires melt extrusion of a thin tape, $10^7$ Poise can be considered to be melt viscid.

The meltprocessable blend can be fed as a blend into the hopper. Alternatively, the blend can be generated from two hoppers during extrusion.

In one embodiment, the melt-viscid fluoropolymer has a melt viscosity of at least about $10^5$ Poise, such as at least about $10^6$ Poise, at least about $10^7$ Poise, at least about $10^8$ Poise, at least about $10^9$ Poise, at least about $10^{10}$ Poise, at least about $10^{11}$ Poise, or even at least about $10^{12}$ Poise.

It is also contemplated that the melt-viscid fluoropolymer has a melt-viscosity of not greater than about $10^{15}$ Poise, such as not greater than about $10^{12}$ Poise, such as not greater than about $10^{11}$ Poise, such as not greater than about $10^{10}$ Poise, such as not greater than about $10^9$ Poise, such as not greater than about $10^8$ Poise, such as not greater than about $10^7$ Poise, or even not greater than about $10^6$ Poise.

In an embodiment, the blend can have a weight ratio of fluoropolymer to LCP of not greater than about 99:1, such as not greater than about 95:5, not greater than about 90:10, not greater than about 85:15, not greater than about 80:20, not greater than about 75:25, not greater than about 70:30, not greater than about 60:40, or not greater than 50:50.

For embodiments where LCP is in equal or lesser amount than the PTFE, the LCP can form a continuous phase, i.e., PTFE forms a discontinuous phase although. This feature is related to the low melt viscosity of LCP and/or properties affecting the surface interaction between the phases.

The weight ratio of fluoropolymer to LCP can be at least about 10:90, such as at least about 20:80, such as at least about 30:70, such as at least about 40:60. In one particular embodiment, the weight ratio is at least about 50:50. In one further particular embodiment, the weight ratio is at least about 60:40.

In another embodiment, the fluoropolymer is present in the blend at least about 5 wt %, such as at least about 10 wt %, at least about 20 wt %, at least about 30 wt %, at least about 40 wt %, at least about 50 wt %, at least about 60 wt %, at least about 70 wt %, or even at least about 80 wt %.

In another embodiment, the LCP is present in the blend at least about 5 wt %, such as at least about 10 wt %, at least about 20 wt %, at least about 30 wt %, at least about 40 wt %, at least about 50 wt %, at least about 60 wt %, at least about 70 wt %, or even at least about 80 wt %.

In another embodiment, the fluoropolymer is present in the blend at not greater than about 95 wt %, such as not greater than about 90 wt %, not greater than about 85 wt %, not greater than about 80 wt %, not greater than about 75 wt %, not greater than about 70 wt %, not greater than about 65 wt %, not greater than about 60 wt %, not greater than about 55 wt %, not greater than about 50 wt %, not greater than about 45 wt %, not greater than about 40 wt %, not greater than about 35 wt %, or even not greater than about 30 wt %.

In even another embodiment, the LCP is present in the blend at not greater than about 95 wt %, such as not greater than about 90 wt %, not greater than about 85 wt %, not greater than about 80 wt %, not greater than about 75 wt %, not greater than about 70 wt %, not greater than about 65 wt %, not greater than about 60 wt %, not greater than about 55 wt %, not greater than about 50 wt %, not greater than about 45 wt %, not greater than about 40 wt %, not greater than about 35 wt %, or even not greater than about 30 wt %.

In an embodiment, the melt-viscid fluoropolymer can be selected from polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer (PFA), perfluoroelastomers (FFKM), or any combination thereof.

In another embodiment, melt-viscid fluoropolymer can include a polymer formed from a fluorine substituted olefin monomer or a polymer including at least one monomer selected from the group consisting of vinylidene fluoride, vinylfluoride, tetrafluoroethylene (TFE), hexafluoropropylene, trifluoroethylene, chlorotrifluoroethylene, perfluorovinylethers, or a mixture of such fluorinated monomers. An exemplary perfluorovinylether includes, for example, perfluoro(alkylvinylether) [PFAVE] or perfluoro(alkoxyalkylvinylether). An exemplary crosslinked fluoropolymer may include a polymer, a polymer blend or a copolymer including one or more of the above monomers, such as, for example, fluorinated ethylene propylene (FEP), ethylene-tetrafluoroethylene (ETFE), poly tetrafluoroethylene-perfluoropropylvinylether (PFA), poly tetrafluoroethylene-perfluoromethylvinylether (MFA), tetrafluoroethylene-hexafluoropropylene-vinylidene fluoride (THV), and the like.

In one further embodiment, the polytetrafluoroethylene (PTFE) may be a modified PTFE. In an example, the modified PTFE is a copolymer of tetrafluoroethylene and a vinyl ether, such as perfluoropropylvinylether (PPVE).

In one embodiment, the LCP can include aromatic polyesters, aromatic polyamides. In a particular embodiment, the LCP can be selected from Xydar, Ekonol, or Vectran, Sumika Super, Zenite.

In another embodiment, the LCP comprises repeat units derived form 4-hydroxybenzoic acid, 4,4'-biphenol, terphthalic acid, isophthalic acid, 1,5-naphthalenedicarboxylic acid, or 2,6-naphthalenedicarboxylic acid, hydroxynapthoic acid, hydroquinone.

In yet another embodiment, the LCP can be selected according to the melting temperature of the melt-viscid fluoropolymer. For example, if PTFE with a melting temperature of about 325° C. is the melt-viscid, the LCP should have a melting point within 20° C., i.e. from 305° C. to 345° C. For example, Xydar with a melting point of 330° C. would be a possible LCP to blend with PTFE. In yet another example, the melting point of the LCP should be within 10° C. of the melting point of the fluoropolymer.

In one embodiment, the blend may further include a filler. The filler can be selected from glass, silica, alumina, talc, calcium carbonate, clay, graphite, molybdenum sulfide, titania, acrylics, polyesters, polyamides, polycarbonates, epoxies, or any combination thereof. Fillers can be in the form of beads, fibers, powder, mesh, or any combination thereof.

The filler can be present in the polymeric article in an amount of at least about 0.1 wt %, such as at least about 10 wt %, at least about 15 wt %, at least about 20 wt %, at least about 25 wt %, or at least about 30 wt %.

The filler can be present in an amount of not greater than about 70 wt %, such as not greater than about 60 wt %, such as not greater than about 50 wt %, such as not greater than about 40 wt %, such as not greater than about 35 wt %, such as not greater than about 30 wt %, or even such as not greater than about 25 wt %.

In one embodiment, the polymeric article according to any one of the preceding claims, wherein the polymeric article comprises a sheet, a tape, a bearing, a seal, or an insulator.

As displayed in FIG. 1, in one further embodiment, the method for preparing a polymeric article includes mixing the melt-viscid fluoropolymer powder with the liquid crystalline polymer (LCP) to form a mixture and shaping the mixture into a meltprocessable product.

Mixing can be done by dry blending the polymers and filling into a hopper from which the mixture undergoes processing. Alternatively, an extruder can be fed from two or more hoppers, each hopper containing one of the polymers.

The meltprocessable product can have any suitable shape for melt processing. For example, the meltprocessable product can be shaped into granules for easy processing with respect to melt-extrusion. In another example, the meltprocessable product can be shaped into a sheet or tape, such as a rolled tape. Such a product is convenient for roll-off melt lamination processes.

Product tapes can have any dimension. For example the tapes can have a width of at least about 5 inches, such as at least about 8 inches, such as at least about 12 inches, such as at least about 15 inches, such as at least about 18 inches, such as at least about 20 inches.

In another example, product tapes have a width that is not greater than about 25 inches, such as not greater than about 22 inches, such as not greater than about 20 inches, such as not greater than about 17 inches, such as not greater than about 15 inches, such as not greater than about 13 inches.

In another example the product tapes can have any suitable thickness. For example, the tapes can have a thickness of at least about 10 microns, such as at least 50 microns, such as at least about 100 microns, such as at least about 200 microns, such as at least about 500 microns, such as at least about 700 microns, such as at least about 1000 microns, such as at least about 1500 microns, such as at least about 2000 microns.

In yet another example, the tapes can have a thickness of not greater than about 10 000 microns, such as not greater than about 8000 microns, such as not greater than about 6000 microns, such as not greater than about 4000 microns, such as not greater than about 3000 microns, such as not greater than about 2000 microns, such as not greater than about 1000 microns.

As shown in FIG. 1, PTFE is mixed with LCP (102). The blend can be used directly in a melt extrusion process (104), i.e., the blend in a powder form is heated and pressed through a die to form an extruded product. In another embodiment, the blend can be used in an injection molding process (106). In an alternative embodiment, a precursor can be formed from the blend of PTFE and LCP (108).

The formed precursor 108 can be in form of pellets of any conventional size or shape. The pellets can be formed containing only PTFE and LCP. In another embodiment, the pellets can include additives, such as fillers, colorants, lubricants, or any other additive beneficial for an intended purpose.

As shown further in FIG. 1, the formed precursor can be directly used in a melt extrusion process (104) or an injectin molding process (106).

In one example, a polymeric article includes a meltprocessable blend of a melt-viscid fluoropolymer and a liquid crystalline polymer (LCP). The blend can have a weight-to-weight ratio of fluoropolymer to LCP of not greater than about 99:1, such as not greater than about 95:5, not greater than about 90:10, not greater than about 85:15, not greater than about 80:20, not greater than about 75:25, not greater than about 70:30, not greater than about 60:40, or not greater than about 50:50.

In another example, the polymeric article includes a melt-viscid fluoropolymer that is selected from polytetrafluoroethylene (PTFE), fluorinated ethylene-propylene (FEP), polyvinylidenefluoride (PVDF), polychlorotrifluoroethylene (PCTFE), ethylene chlorotrifluoroethylene (ECTFE), perfluoroalkoxypolymer (PFA), perfluoroelastomers (FFKM), or any combination thereof.

In yet one further example, the polymeric article includes a melt-viscid fluoropolymer that has a melt viscosity of at least about $10^5$ Poise, such as at least about $10^6$ Poise, at least about $10^7$ Poise, at least about $10^8$ Poise, at least about $10^9$ Poise, at least about $10^{10}$ Poise, at least about $10^{11}$ Poise, or even at least about $10^{12}$ Poise.

In another example, the polymeric article includes a LCP that can have repeat units derived form 4-hydroxybenzoic acid, 4,4'-biphenol, terphthalic acid, isophthalic acid, 1,5-naphthalenedicarboxylic acid, or 2,6-naphthalenedicarboxylic acid, hydroxynapthoic acid, hydroquinone.

In an example, the polymeric article can further include a filler. The filler can be selected from glass, glass fiber, silica, alumina, talc, calcium carbonate, clay, graphite, molybdenum sulfide, titania, acrylics, polyesters, polyamides, polycarbonates, epoxies, carbon, carbon fiber, aramid, aramid fibers, boron nitride, or any combination thereof.

The filler can be present in the polymeric article by at least about 0.1 wt %, such as at least about 10 wt %, at least about 15 wt %, at least about 20 wt %, at least about 25 wt %, or at least about 30 wt %.

In an example, the polymeric article can include a sheet, a tape, a bearing, a seal, or an insulator.

In yet another example, a method for preparing a polymeric article includes mixing a melt-viscid fluoropolymer powder with a liquid crystalline polymer (LCP) to form a mixture. The mixture can further be processed into a meltprocessable product.

In an example, the mixture can have a weight ratio of melt-viscid fluoropolymer to LCP of not greater than about 99:1, such as not greater than about 95:5, not greater than about 90:10, not greater than about 85:15, not greater than about 80:20, not greater than about 75:25, not greater than about 70:30, not greater than about 60:40, or not greater than about 50:50.

In another example, the method can further include adding a filler during the mixing of the fluoropolymer and the LCP. The filler can be selected from glass, glass fiber, silica, alumina, talc, calcium carbonate, clay, graphite, molybdenum sulfide, titania, acrylics, polyesters, polyamides, polycarbonates, epoxies, carbon, carbon fiber, aramid, aramid fibers, boron nitride, or any combination thereof.

In one example, the method includes processing the melt-processable product into a tape.

In yet one further example, a method for reducing a melt viscosity of a fluoropolymer composition includes mixing a liquid crystalline polymer (LCP) into a fluoropolymer powder to form a mixture. The weight ratio of fluoropolymer to LCP can be at least 50:50 and not greater than about 99:1, such as not greater than about 95:5, not greater than about 90:10, not greater than about 85:15, not greater than about 80:20, not greater than about 75:25, not greater than about 70:30, or not greater than about 60:40. The method can further include processing the mixture into a product.

In another example, the method can further include adding a filler during the mixing of the fluoropolymer and the LCP. The filler can be selected from glass, glass fiber, silica, alumina, talc, calcium carbonate, clay, graphite, molybdenum sulfide, titania, acrylics, polyesters, polyamides, polycarbonates, epoxies, carbon, carbon fiber, aramid, aramid fibers, boron nitride, or any combination thereof.

In another example, the product prepared by the method can be a tape, a sheet, a seal, a bearing, or an insulator.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

EXAMPLES

Example 1

Processing

LCP were purchased from Sumitomo (E5000_, Ticona (Vectra A950), and Solvay (SRT 802, SRT 900). PTFE was purchased from Hereflon (Repro HD). LCP was microcompounded and mixed with PTFE. A950 and E5000 were blended with PTFE at a ratio of 50/50 and 25/75 and melt extruded at temperatures between 300° C. and 400° C. A950 is a LCP with a melting point of 280° C. and a processing temperature between 300° C. and 330° C. Film thickness of the samples were between 5 and 7 mil. E5000 has a melting point of 400° C.

Blends of LCP/PTFE at 25/75 and 50/50 were produced as tape (A950 and E5000) and as injection molded parts (A950 only)

Figure 2A:
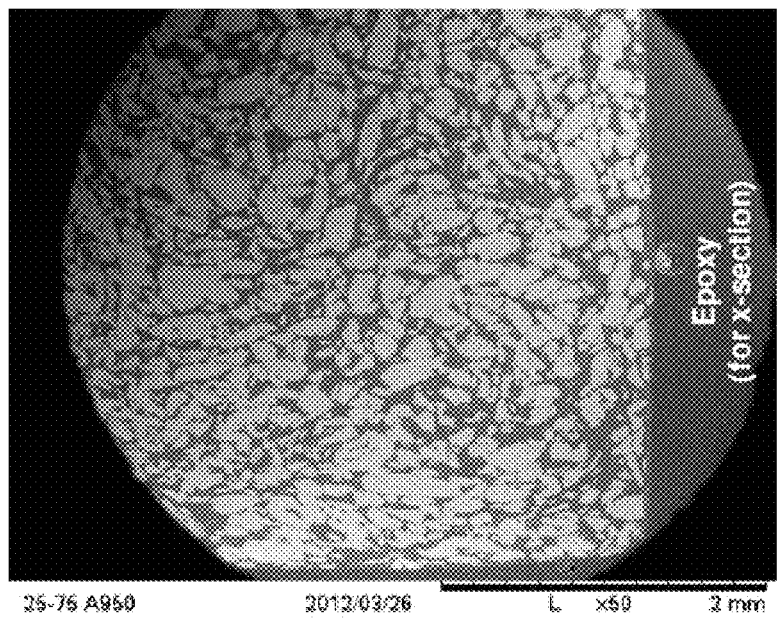
FIGS. 2a and 2b are scanning electron microscope ("SEM") images of an embodiment of a polymeric article.
Figure 2B:
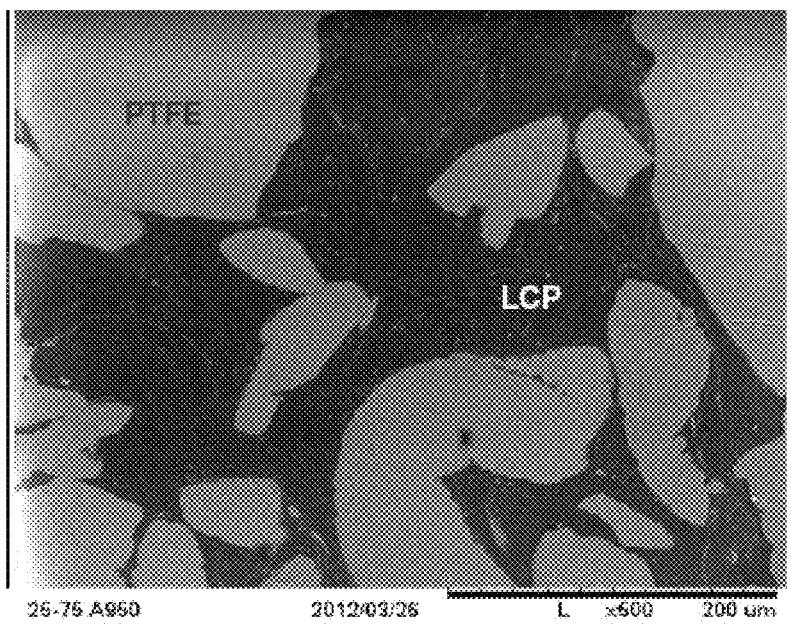

FIGS. 2a and 2b depict Scanning Electron Microscope ("SEM") images of a A950/PTFE injection molding in the weight ratio of 25/75. The darker regions are the A950 phase and the brighter phases are PTFE. Even at a ratio of 25/75, the LCP phase forms a continuous phase around the PTFE.

Example 2

Lamination

A lamination on steel substrate was conducted at 330° C. using the A950/PTFE blend tape that was extruded at 300° C. at a 50/50 ratio. Thicknesses was varied by stacking several (6 or 7) layers of the extruded tape on top of each other. Cold rolled steel amd zinc plated steel were used as listed below, and were cleaned with isopropyl alcohol before use. The parts were heated on the press to 330° C., and then pressed at ~50 psi for 5 minutes, and cooled under pressure with air/water mix through the press to about 177° C. in less than 5 minutes.

Laminate A: 230 mil cold rolled steel, 100 microns of LCP/PTFE added

Laminate B: 240 mil Zn plated steel, 100 microns of LCP/PTFE added

A 0.5" wide strip of each laminate was cut, bent and rolled into a ring or spirale with a 1" radius. No delamination was observed. Scratching the surface with a needle point produced surface damage, with no signs of delamination.

Example 3

Tribological Data

Block on Ring testing according to ASTM standard G77-05 and modified Thrust Washer testing according to ASTM D-3702-94 was completed. Table 1 summarizes the results of the tests. For the Block on Ring tests, the tests were run in oscillation mode using a standard Falex S-10 ring, SAE 4620, Rc 58-63, 6-12 rms and the testing time was 2 hours. For the modified Thrust Washer testing, three ¼ inch diameter discs were used in place of the typical raised lip test specimen. The three discs were equally distributed in a sample holder, and run continuously around a circular path of the same average radius as is used by the standard raised lip test specimen. The counterpart used was of the geometry described in D-3702 with a surface roughness of 0.10 micron Ra, and testing time was 72 hours.

For comparison, modified Thrust Washer Tests and Block on Ring Tests were also conducted on samples of 25 weight % glass fiber filled PTFE and 25 weight % carbon/graphite filled PTFE.

TABLE 1

|  | Modified Thrust Washer Tests | | | Block on Ring Test | | |
| --- | --- | --- | --- | --- | --- | --- |
|  | COF | Temp/ ° C. | Loss/ mg | COF | Temp/ ° C. | Wear/ mm$^3$ |
| 50/50 A950/PTFE | 0.21 | 60 | 2.0 | 0.15 | 38 | 2.2 |
| 25/75 A950/PTFE | 0.21 | 63 | 0.4 | 0.15 | 38 | 3.2 |
| Glass fiber filled PTFE | 0.41 | 84 | 6.7 | 0.30 | 60 | 7.8 |
| Carbon and Graphite filled PTFE | 0.24 | 69 | 4.0 | 0.17 | 48 | 4.8 |

Figure 3A:
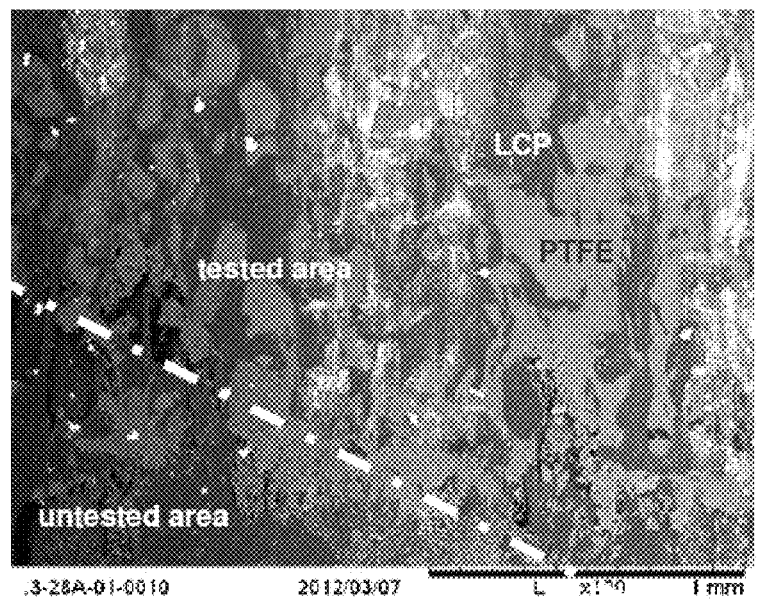
FIGS. 3a and 3b are SEM images of an embodiment of a polymeric article after tribological testing.
Figure 3B:
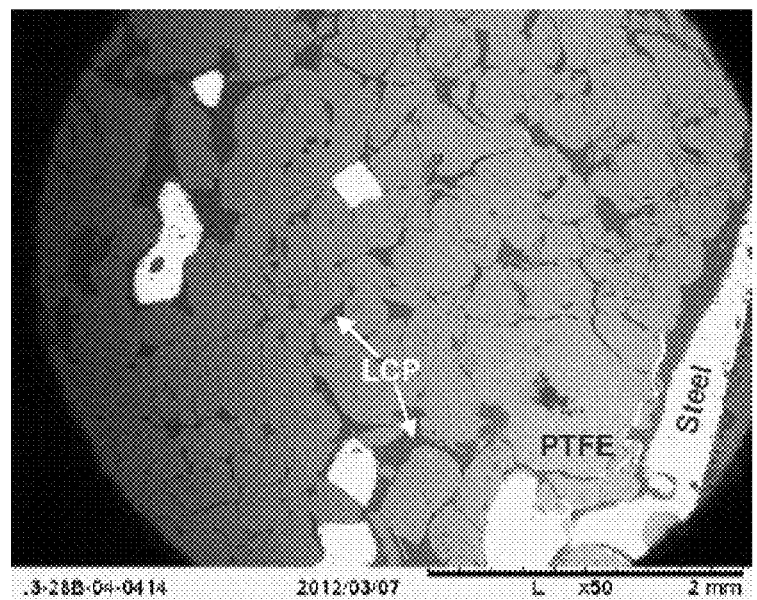

FIG. 3 depict SEM images of the test samples. FIG. 3a is a sample that was glued using epoxy to a steel blank and tested in the Block on Ring (data not reported). The epoxy produced the bright streaks that are visible on the surface of the worn area. FIG. 3b is the same 25/75 film after a hot lamination with no epoxy or additional glue phase. Some of the LCP flowed out due to the molding pressure that was used and therefore the depth of the coating was determined by the PTFE particle size. Some steel was exposed for these laminates, but the LCP adhered well enough for the sample to be tested.

Blocks were also cut from the injection molded parts, and by stacking 2 together they perfectly fit the Block on Ring holder. Blocks of the 25/75 and 50/50 A950 LCP/PTFE blends were tested with oscillating Block on Ring for 2 hours and that data is reported in Table 1.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A polymeric article comprising a meltprocessable blend of a non-meltprocessable fluoropolymer having a melt viscosity of at least about $10^8$ Poise and a liquid crystalline polymer (LCP), wherein the melting point of the LCP is within 10° C. of the melting point of the non-meltprocessable fluoropolymer, the polymeric article is meltprocessed, and the blend includes at least about 60 wt % of the non-meltprocessable fluoropolymer.

2. The polymeric article according to claim 1, wherein the non-meltprocessible fluoropolymer includes a polytetrafluoroethylene (PTFE), a fluorinated ethylene-propylene (FEP), a polyvinylidenefluoride (PVDF), a polychlorotrifluoroethylene (PCTFE), an ethylene chlorotrifluoroethylene (ECTFE), a perfluoroalkoxypolymer (PFA), a perfluoroelastomers (FFKM), or any combination thereof.

3. The polymeric article according to claim 1, wherein the blend includes at least about 70 wt % of the non-meltprocessable fluoropolymer.

4. The polymeric article according to claim 1, wherein the LCP comprises repeat units derived form 4-hydroxybenzoic acid, 4,4'-biphenol, terphthalic acid, isophthalic acid, 1,5-naphthalenedicarboxylic acid, or 2,6-naphthalenedicarboxylic acid, hydroxynapthoic acid, hydroquinone.

5. The polymeric article according to claim 1, wherein the blend includes at least about 85 wt % of the non-meltprocessable fluoropolymer.

6. The polymeric article according to claim 1, further comprising a filler including a glass, a glass fiber, a silica, an alumina, a talc, a calcium carbonate, a clay, a graphite, a molybdenum sulfide, a titania, an acrylic, a polyester, a polyamide, a polycarbonate, an epoxy, a carbon, a carbon fiber, an aramid, an aramid fiber, a boron nitride, or any combination thereof.

7. The polymeric article according to claim 1, wherein the polymeric article comprises a sheet, a tape, a bearing, a seal, or an insulator.

8. A method for preparing a polymeric article, the method comprising:
   mixing a non-meltprocessable fluoropolymer powder with a liquid crystalline polymer (LCP) to form a mixture, wherein a weight ratio of non-meltprocessable fluoropolymer to LCP is at least about 60:40; and mixing includes dry blending the non-meltprocessable fluoropolymer and LCP;
   processing the mixture into a meltprocessable product, wherein the melting point of the LCP is within 10° C. of the melting point of the non-meltprocessable fluoropolymer.

9. The method according to claim 8, wherein the LCP forms a continuous phase around the non-meltprocessable fluoropolymer in the mixture.

10. The method according to claim 8, wherein the non-meltprocessable fluoropolymer is selected from polytetrafluoroethylene (PTFE), fluorinated ethylene-propylene (FEP), polyvinylidenefluoride (PVDF), polychlorotrifluoroethylene (PCTFE), ethylene chlorotrifluoroethylene (ECTFE), perfluoroalkoxypolymer (PFA), perfluoroelastomers (FFKM), or any combination thereof.

11. The method according to claim 8, wherein the non-meltprocessable fluoropolymer has a melt viscosity of at least about $10^8$ Poise.

12. The method according to claim 8, wherein the LCP comprises repeat units derived form 4-hydroxybenzoic acid, 4,4'-biphenol, terphthalic acid, isophthalic acid, 1,5-naphthalenedicarboxylic acid, or 2,6-naphthalenedicarboxylic acid, hydroxynapthoic acid, hydroquinone.

13. The method according to claim 8, further comprising processing the meltprocessable product into a tape.

14. A method for reducing a melt viscosity of a fluoropolymer composition including a non-melt processable fluoropolymer, the method comprising:
   mixing a liquid crystalline polymer (LCP) into the non-melt processable fluoropolymer powder to form a mixture, wherein a weight ratio of fluoropolymer to LCP is at least about 60:40 and not greater than about 99:1; and
   processing the mixture into a meltprocessable product, wherein the melting point of the LCP is within 10° C. of the melting point of the non-meltprocessable fluoropolymer.

15. The method according to claim 14, wherein the non-melt processible fluoropolymer is selected from polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer (PFA), perfluoroelastomers (FFKM), or any combination thereof.

16. The method according to claim 14, wherein the non-melt processable fluoropolymer has a melt viscosity of at least about $10^8$ Poise.

17. The method according to claim 14, wherein the product is selected from a tape, a sheet, a seal, a bearing, or an insulator.

18. The polymeric article according claim 3, wherein the LCP forms a continuous phase around the non-meltprocessable fluoropolymer.

* * * * *